United States Patent [19]

Siebrecht

[11] Patent Number: 4,879,123
[45] Date of Patent: Nov. 7, 1989

[54] TUBULAR PACKAGE CASING COMPOSED OF MUTUALLY CONNECTED SECTIONS

[75] Inventor: Manfred Siebrecht, Wiesbaden, Fed. Rep. of Germany

[73] Assignee: Hoechst Aktiengesellschaft, Frankfurt am Main, Fed. Rep. of Germany

[21] Appl. No.: 184,415

[22] Filed: Apr. 21, 1988

[30] Foreign Application Priority Data

Apr. 22, 1987 [DE] Fed. Rep. of Germany ....... 3713479

[51] Int. Cl.$^4$ ......................... A22C 13/00; A23L 1/317
[52] U.S. Cl. ................................. 426/105; 132/118.1; 426/135; 428/34.8
[58] Field of Search ....................... 426/105, 135, 129; 138/118.1; 428/34.8, 35.2

[56] References Cited

U.S. PATENT DOCUMENTS

| | | | |
|---|---|---|---|
| 2,608,488 | 8/1952 | Rumsey | 138/118.1 |
| 3,562,368 | 2/1971 | Bridgeford | 264/36 |
| 3,669,791 | 6/1972 | Bridgeford | 156/244 |
| 4,391,302 | 7/1983 | Huhn et al. | 138/118.1 |
| 4,396,039 | 8/1983 | Klenk et al. | 426/135 X |
| 4,401,135 | 8/1983 | Andra et al. | 426/135 X |
| 4,410,011 | 10/1983 | Andra et al. | 426/105 X |
| 4,610,742 | 9/1986 | Rop et al. | 426/105 X |
| 4,736,775 | 4/1988 | Oxley | 426/105 X |

FOREIGN PATENT DOCUMENTS 2934306 3/1981 Fed. Rep. of Germany .

*Primary Examiner*—Arthur L. Corbin
*Attorney, Agent, or Firm*—Foley & Lardner, Schwartz, Jeffery, Schwaab, Mack, Blumenthal & Evans

[57] ABSTRACT

A tube, in particular sausage casing, is composed of mutually connected sections which at the connection point, prior to connection, possess cut edges extending approximately at right angles to the longitudinal axis of the tube and parallel to each other. The sections are connected by an adhesive tape extending around the outside of the tube. When the tube, possessing two folded edges extending parallel to each other, is flattened, the part of the cut edges of one section extending from a first folded edge of the other opposite folded edge is situated within the tube and the other part of this cut edge, which extends from the second folded edge back to the first folded edge, is situated on the outside of the tube. Parts of the cut edge of the other section are situated in reversed arrangement, firstly on the outside of the tube and then within the tube.

9 Claims, 2 Drawing Sheets

TUBULAR PACKAGE CASING COMPOSED OF MUTUALLY CONNECTED SECTIONS

BACKGROUND OF THE INVENTION

The present invention relates to a tube, in particular to an artificial sausage casing, which is composed of mutually connected sections. At the connection point the sections end in linear cut edges, which extend approximately at right angles to the longitudinal axis of the tube. The cut edges of the sections extend parallel to one another. An adhesive tape extending around the outside of the tube connects the two sections and forms a leak-tight closure. The invention also relates to a process for the production of a tube having sections mutually connected in this way.

In the continuous production of tubes, it is frequently necessary to introduce coating liquids into the interior of the tube or to remove process gases which accumulate in the tube cavity. To accomplish this, the tube is provided at certain intervals with an aperture which is closed again by means of a masking after introduction of the coating liquid or removal of the process gases (German Offenlegungsschriften No. 1,814,590 and No. 2,934,306). It is also known, in order to open the tube, to incise a longitudinal slit and subsequently to cut out from the tube and discard the piece of tube provided with the incision. The ends of the two tube sections formed by the cutting-out of the piece of tube then have to be mutually connected again, which is generally done by pushing the end of one tube section a distance of about 10 cm into the cavity of the other tube section and fixing the connection by means of an adhesive strip placed around the tube.

The production of this overlapping connection between the two tube sections is possible only in a costly working step, which does not permit simple automation. This type of connection additionally has the severe disadvantage that, when pipe-shaped articles are introduced, for example, the shirring mandrel of a shirring apparatus in the production of tightly shirred sausage casings or the stuffing horn of a filling apparatus for forcing in pasty products, attention has to be paid to a particular direction of movement. The relative movement occurring between pipe and tube must always be such that the pipe, when passing the connection point, moves from the tube section positioned inside into the cavity of the other tube section. If by contrast the pipe is pushed through the tube in the reverse direction, it encounters the tube section positioned inside at the connection point, so that the process sequence is interrupted and the connection point may even be ruptured.

In the production of the tube, therefore, care must be taken to ensure that the tube sections which are situated inside at the connection points always form the downstream tube section, as seen in the machine direction, so that during shirring or filling, the tube running off the roll in the opposite direction is guided in the correct direction over the shirring mandrel or over the stuffing horn at each connection point. Consequently, if a tube roll is printed before further processing, the runoff direction of the printed, rewound tube is changed to the opposite direction. Because of the connection points, therefore, re-winding must take place in an additional working step after the end of the printing process.

A further connecting technique envisages adhesive butt jointing by means of adhesive strips. Even with the most accurate adhesive butt jointing, the winding tension, on the one hand, and shrinkage of the tube material on the roll, on the other hand, will result in the formation of a gap, which is masked by the adhesive strip. As a result, in the flattened state, the adhesive side of the adhesive strip of the top comes into contact with the adhesive side of the adhesive strip of the bottom, so that the tube is closed at the point of adhesion and cannot be opened easily or without damage.

SUMMARY OF THE INVENTION

It is therefore an object of the present invention to provide an improved tubular package having mutually connected sections.

It is also an object of the invention to provide a process for connection of the tube sections which is easier to carry out and which can be easily automated.

In accomplishing these objects, there has been provided in accordance with one aspect to the present invention a tube, comprising mutually connected first and second longitudinal sections of flexible material, these sections having at the connection point cut edges which extend approximately at right angles to the longitudinal axis of the tube and parallel to each other and cut edge regions which overlap; and an adhesive tape extending around the outside of the tube and connecting the sections to one another. In the case of the tube in a flattened condition having two folded edges extending parallel to each other, a first half of the cut edge region of the first section which extends along a first side from a first folded edge to the other opposite folded edge is situated within the tube and a second half of the cut edge region of the first section which extends along a second side, opposite the first side, from the second folded edge back to the first folded edge is situated on the outside of the tube. Similarly, a first half of the cut edge region of the second section which extends along the first side is situated on the outside of the tube and a second half of the edge region of the second section which extends along the second side is situated within the tube.

The interior of the tube in the region of the connection points is designed so that the tube can be drawn over pipe-shaped bodies without problems and independently of the direction of advance.

In accordance with another aspect of the invention, there has been provided a process for the production of a tube comprised of the mutually connected sections as defined above, comprising the steps of (a) superimposing first and second flattened tube sections each having a cut edge extending approximately at right angles to the longitudinal axis of the tube so that the cut edges extend substantially parallel to each other and the two tube sections extend in opposite directions and possess a common longitudinal axis, to provide an overlapping zone of the two sections determined by the mutual distance apart of the cut edges which is relatively small in comparison to the length of the cut edges; and (b) applying an adhesive tape masking the overlapping zone around the tube periphery to thereby mutually connect the two sections. Preferably, the process further comprises the step of opening the flattened tube sections after step (b) into an at least oval cross section, whereby the configuration of the first and second edge regions is produced. In a most preferred embodiment, the process also includes the steps of again flattening the tube and winding the tube on a roll.

Other objects, features and advantages of the present invention will become apparent from the following detailed description of preferred embodiments. It should be understood, however, that the detailed description and the specific examples, while indicating preferred embodiments of the invention, are given by way of illustration only, since various changes and modifications within the spirit and scope of the invention will become apparent to those skilled in the art.

DETAILED DESCRIPTION OF PREFERRED EMBODIMENTS

Figure 1:
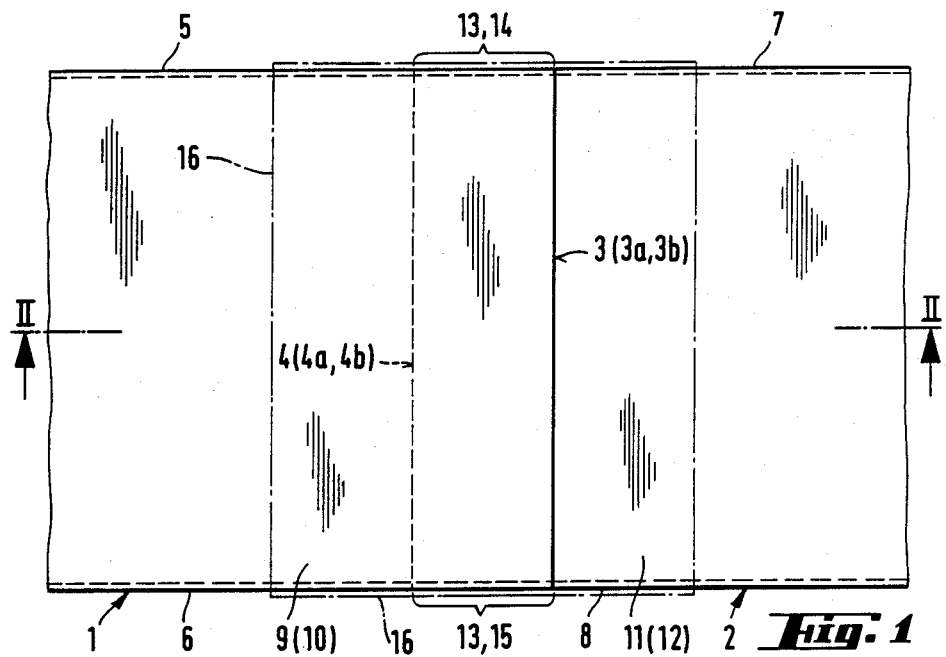
FIG. 1 is a plan view of two superposed tube sections before connection.

The tube is preferably a packaging casing, in particular, an artificial sausage casing. It is composed of a conventional base material, for example, of flexible plastic or cellulose, and possesses a suitable caliber for the intended application. In one particular embodiment, the tube is an artificial sausage casing in the form of a flexible plastic tube, particularly based on an amide homopolymer or copolymer extruded in tubular form, a non-reinforced cellulose tube, such as is known, for example, as a so-called peel-off casing, or in the form of a so-called fiber-reinforced casing, which possesses a base layer of fiber-reinforced cellulose, with or without an internal and/or external coating or impregnation which is conventional for cellulose casings. These fiber-reinforced sausage casings usually possess a diameter of 40 to 150 mm. The tube, laid flat, can be wound up on a roll or be in the form of a section tied off at one end. It can also be pushed onto a pipe-shaped shirring mandrel without problems, and be shirred and compressed to a length of from 1% to 2% of its original length. It then exhibits the shape of a hollow rod, which can be pushed onto the stuffing horn of a filling machine for machine processing.

The tube is composed of two or more tube sections which are connected to each other in a special manner. In the region of the connection point, each section possesses cut edges which are as linear as possible and form a right angle or approximately a right angle to the longitudinal axis of the tube sections.

The tube sections are connected in the flattened state. Each tube section then possesses two folded edges, extending parallel to each other. The two folded edges define two superposed tube halves and end at a right angle to the cut edge of the tube section.

The two flattened tube sections are superposed for mutual connection, so that the folded edges of one tube section form continuous, flush lines with those of the other tube section; and both tube sections extend in opposite directions. In this position, the cut edges of the two tube sections must necessarily extend parallel to each other, and both tube sections must possess a common longitudinal axis.

The two tube sections, which initially are still loosely superposed, contact each other in an overlapping zone which is of approximately rectangular shape. The length of the longer lines of this rectangular shape are determined by the length of the flattened cut edges. The width of the overlapped portions is determined by the mutual distance apart of the cut edges, which is small in relation to the length of the flattened cut edges and should preferably not exceed about 10 mm. The mutual distance apart of the cut edges, by which the size of the overlapping zone can be varied, is in general selected in the region from about 1 to 5 mm.

The next step is the wrapping of the two superposed tube sections, in the region of the overlap, with an adhesive tape, preferably a contact-adhesive tape, which produces a firm connection by means of the action of pressure alone.

An adhesive tape is taken to mean all possible tapes which produce a connection between the tape and the tube surface which is firm, even though detachable if desired. The two tube sections are still situated one above the other in this flattened state.

When the tube is opened, forming an approximately oval or circular cross section, the two cut edges arranged inside the mutually connected sections now exchange places. The inner cut edge of the lower tube section slides upwardly, and the inner cut edge of the upper tube section slides downwardly. The tube then possesses the connection point described above.

The tube with the tube sections connected according to the invention can be readily pushed onto pipe-shaped objects, for example, onto a stuffing horn or a shirring mandrel. The process for connecting the tube sections is simple and cost-effective and can easily be carried out by automatic machinery.

Figure 2:
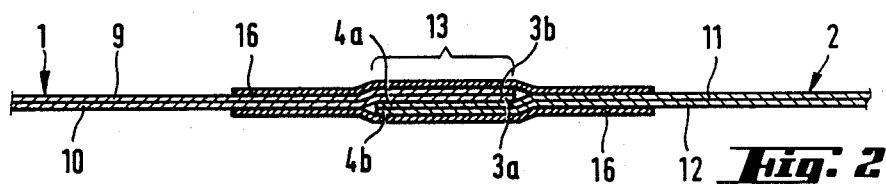
FIG. 2 is a cross-sectional view taken along the line II—II in FIG. 1, with the addition of adhesive tape.

The invention is explained in detail by the Figures. In FIG. 1, the tube sections 1 and 2 are superposed in the flat position. Each section 1, 2 ends in a linear cut edge 3, 4 and possesses folded edges 5, 6 and 7, 8 respectively. The folded edges 5, 6 and 7, 8 define the superposed tube halves 9, 10 and 11, 12 (FIG. 2). The rectangular overlapping zone 13 is defined b the cut edges 3, 4 and the extents 14 and 15 of the folded edges 5, 7 and 6, 8, which simultaneously indicate the distance apart of the cut edges 3, 4.

Figure 3:
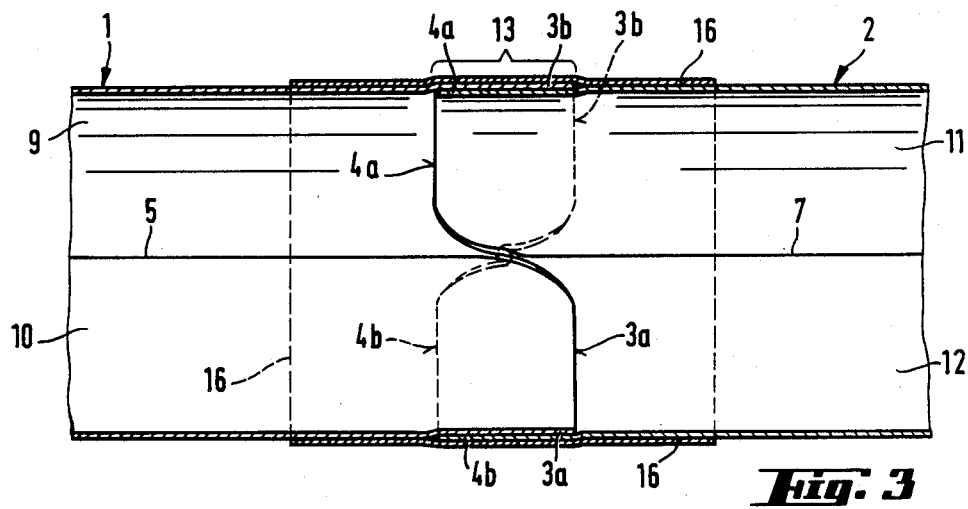
FIG. 3 shows the tube shown in FIG. 2 in the open condition.
Figure 4:
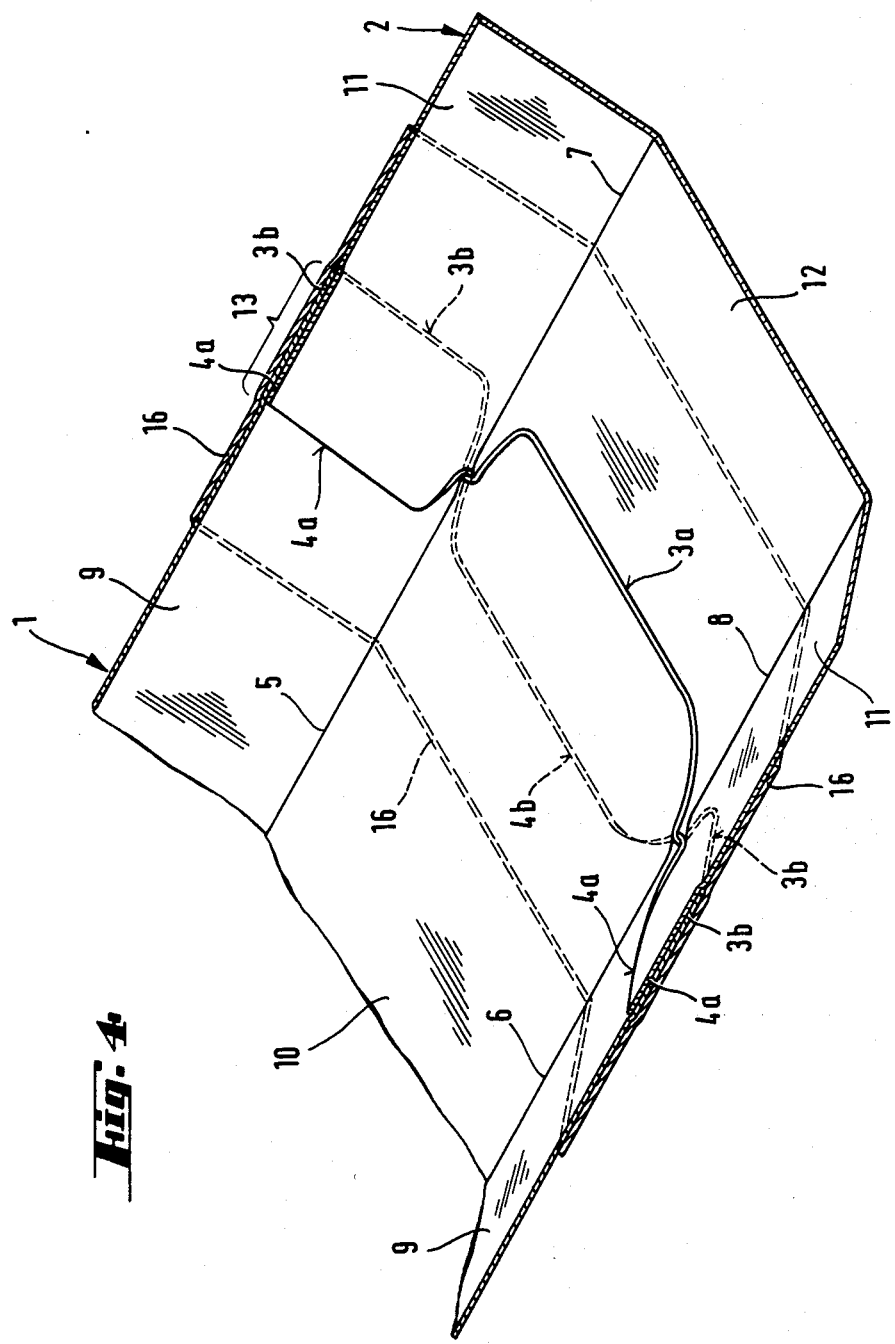
FIG. 4 is a perspective view of the tube of FIG. 3 in the cut-open state.

In FIG. 2 to FIG. 4, the numerals 1 to 15 have the same meaning. The overlapping zone 13 is masked by an adhesive tape 16. The respective inner cut edges are designated 3a and 4a, and these exchange places in the case of the opened tube of FIG. 3. The cut edges 3b and 4b are on the outside. In FIG. 4, the tube is shown in a cut-open state, where the cut is made longitudinally along the center of the sides 9, 11 of the two tube sections.

What is claimed is:

1. A tube, comprising:
   mutually connected first and second longitudinal sections of flexible material, said sections having at the connection point cut edges which extend approximately at right angles to the longitudinal axis of the tube and parallel to each other and cut edge regions which overlap in an overlapping zone which is of approximately rectangular shape when the tube is in a flattened condition and;
   an adhesive tape extending around the outside of the tube and connecting said sections to one another, wherein in the case of the tube in a flattened condition having two folded edges extending parallel to each other, a first half of the cut edge region of the first section which extends along a first side from a first folded edge to the other opposite folded edge is situated within the tube and a second half of the cut edge region of the first section which extends along a second side, opposite said first side, from the second folded edge back to the first folded edge is situated on the outside of the tube, while a first half of the cut edge region of the second section which extends along the first side is situated on the outside of the tube and a second half of the cut edge region of the second section which extends along the second side is situated within the tube.

2. A tube as claimed in claim 1, wherein the width of the overlapping zone of the cut edge regions of the two sections is relatively small in relation to its length.

3. A tube as claimed in claim 2, wherein the width does not exceed about 10 mm.

4. A tube as claimed in claim 3, wherein the width is from about 1 to 5 mm.

5. A tube as claimed in claim 1, wherein the tube is comprised of cellulose, fiber-reinforced cellulose or flexible plastic.

6. A tube as claimed in claim 5, wherein the flexible plastic comprises polyamide, polyester or PVDC.

7. A tube as claimed in claim 1, wherein the tube comprises an artificial sausage casing and the tube is shirred to form a hollow rod.

8. A tube as claimed in claim 1, wherein the adhesive tape contains a contact adhesive.

9. A sausage product comprising a tube as defined by claim 1 containing therein a sausage emulsion.

* * * * *